US012200106B2

United States Patent
Jang et al.

(10) Patent No.: US 12,200,106 B2
(45) Date of Patent: Jan. 14, 2025

(54) MEMORY DEVICE AND METHOD FOR DATA ENCRYPTION/DECRYPTION OF MEMORY DEVICE

(71) Applicant: SAMSUNG ELECTRONICS CO., LTD., Suwon-si (KR)

(72) Inventors: Jae Hun Jang, Hwaseong-si (KR); Ji Youp Kim, Hwaseong-si (KR); Han Byeul Na, Yongin-si (KR); Young Suk Ra, Seoul (KR); Man Keun Seo, Hwaseong-si (KR); Hong Rak Son, Anyang-si (KR); Se Jin Lim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 343 days.

(21) Appl. No.: 17/698,639

(22) Filed: Mar. 18, 2022

(65) Prior Publication Data

US 2023/0068302 A1 Mar. 2, 2023

(30) Foreign Application Priority Data

Aug. 31, 2021 (KR) .......................... 10-2021-0115254

(51) Int. Cl.
| | |
|---|---|
| *H04L 9/06* | (2006.01) |
| *G06F 3/06* | (2006.01) |
| *G06F 21/60* | (2013.01) |
| *G06F 21/72* | (2013.01) |

(52) U.S. Cl.
CPC .......... *H04L 9/0637* (2013.01); *G06F 3/0679* (2013.01); *G06F 21/602* (2013.01); *G06F 21/72* (2013.01); *H04L 9/0618* (2013.01)

(58) Field of Classification Search
CPC ... H04L 9/0637; H04L 9/0618; G06F 3/0679; G06F 3/0623; G06F 3/0658; G06F 21/602; G06F 21/72
See application file for complete search history.

(56) References Cited

U.S. PATENT DOCUMENTS

| | | | |
|---|---|---|---|
| 8,666,064 B2 | 3/2014 | Choi et al. | |
| 8,908,859 B2 | 12/2014 | Fujisaki | |
| 9,002,002 B1 | 4/2015 | Poo et al. | |
| 9,904,807 B2 | 2/2018 | Matsuo | |
| 10,396,978 B2 | 8/2019 | Choi et al. | |
| 2011/0255689 A1* | 10/2011 | Bolotov | ................ H04L 9/0631 380/42 |
| 2012/0069993 A1* | 3/2012 | Fujisaki | ................ H04L 9/0637 380/28 |
| 2017/0063532 A1* | 3/2017 | Bhattacharyya | ........ G06F 21/76 |
| 2020/0110906 A1 | 4/2020 | Choi et al. | |
| 2020/0119903 A1* | 4/2020 | Thomas | ................ H04L 9/0637 |

* cited by examiner

*Primary Examiner* — Khoi V Le

(74) *Attorney, Agent, or Firm* — Fish & Richardson P.C.

(57) ABSTRACT

A memory device includes an input unit configured to receive a plain text and output plain blocks and CTS plain block, a multi-core unit including a plurality of encryption/decryption cores configured to encrypt each of the plain blocks provided from the input unit and output cipher blocks in accordance with control of an encryption/decryption core control unit, a CTS core unit including a CTS core configured to encrypt the CTS plain block provided from the input unit into a CTS cipher block, and an output unit configured to receive the cipher blocks and the CTS cipher block and output a cipher text. The CTS plain block is generated through a CTS calculation based on the plain text.

8 Claims, 18 Drawing Sheets

FIG. 5B

|  | Key Length | Block Size | Numbers of Rounds |
|---|---|---|---|
| AES-128 | 128bit | 16Byte | 10 |
| AES-192 | 192bit | 16Byte | 12 |
| AES-256 | 256bit | 16Byte | 14 |

MEMORY DEVICE AND METHOD FOR DATA ENCRYPTION/DECRYPTION OF MEMORY DEVICE

CROSS-REFERENCE TO RELATED APPLICATION

This application is based on and claims the benefit of priority under 35 U.S.C. § 119 to Korean Patent Application No. 10-2021-0115254, filed on Aug. 31, 2021 in the Korean Intellectual Property Office, the disclosure of which is incorporated herein by reference in its entirety by reference.

BACKGROUND

1. Field

The present disclosure relates to a memory device and a method for data encryption/decryption of the memory device.

2. Description of the Related Art

As capabilities of attackers are improved due to developments of communication techniques and information processing techniques, the demand for secure crypto systems is increasing. In general, cipher data that has undergone a more complex encryption process is more secure. Because more calculations are required to encrypt the data, an encryption/decryption device performs the calculation, using multiple cores for a high speed operation. However, power consumption increases when multiple cores are used for the encryption/decryption calculation. Additionally, as apparatuses including the encryption/decryption device become smaller, structures having higher degrees of integration are required.

SUMMARY

The technical problem addressed by the teachings herein are not limited to the above-mentioned problems, and other problems not mentioned will be clearly understood by those skilled in the art from the following description.

According to an aspect of the present disclosure, a memory device includes an input unit, a multi-core unit, a CTS core unit, and an output unit. The input unit is configured to receive a plain text and output plain blocks and CTS plain block. The multi-core unit includes a plurality of encryption/decryption cores configured to encrypt each of the plain blocks provided from the input unit and output cipher blocks in accordance with control of an encryption/decryption core control unit. The CTS core unit includes a CTS core configured to encrypt the CTS plain block provided from the input unit into a CTS cipher block. The output unit is configured to receive the cipher blocks and the CTS cipher block and output a cipher text. The CTS plain block is generated through a CTS calculation based on the plain text.

According to another aspect of the present disclosure, a memory device includes an input unit, a multi-core unit, and an output unit. The input unit is configured to receive a plain text, divide the plain text, and output first plain blocks to fourth plain blocks. The multi-core unit is configured to receive the first plain blocks to fourth plain blocks from the input unit, encrypt the first plain blocks to fourth plain blocks and output them into first cipher blocks to fourth cipher blocks. The output unit is configured to receive the first cipher blocks to fourth cipher blocks from the multi-core unit, and output a cipher text. The multi-core unit includes a first encryption/decryption core, a second encryption/decryption core different from the first encryption/decryption core, and an encryption/decryption core control unit configured to control the first encryption/decryption core and the second encryption/decryption core. The first encryption/decryption core is configured to encrypt the first plain block to generate a first cipher block, and then encrypt the third plain block to generate a third cipher block. The second encryption/decryption core is configured to encrypt the second plain block to generate a second cipher block, and then encrypt the fourth plain block to generate a fourth cipher block. The input unit includes an input register, and the input register is configured to store the first plain blocks to fourth plain blocks, and after the first and second cipher blocks are each generated in the first and second encryption/decryption cores, the input register is configured to provide the third and fourth plain blocks to each of the first and second encryption/decryption cores.

According to another aspect of the present disclosure, a method for data encryption/decryption of a memory device includes encrypting a first plain block in a first encryption/decryption core to generate a first cipher block, and encrypting a second plain block in a second encryption/decryption core in synchronization with the first encryption/decryption core to generate a second cipher block. The method also includes dividing the second cipher block into a second cipher block head and a second cipher block tail, adding the second cipher block tail and the plain text tail to generate a CTS plain block, and starting encryption of the CTS plain block into a CTS cipher block in a CTS core. The method further includes starting encryption of a third plain block in the first encryption/decryption core to generate a third cipher block, while the CTS plain block is encrypted into the CTS cipher block in the CTS core, and starting encryption of a fourth plain block in the second encryption/decryption core to generate a fourth cipher block, while the CTS plain block is encrypted into the CTS cipher block in the CTS core.

Other features and embodiments may be apparent from the following detailed description, the drawings and the claims.

BRIEF DESCRIPTION OF THE DRAWINGS

These and other aspects and features of the present disclosure will become more apparent by describing in detail exemplary embodiments thereof referring to the attached drawings, in which:

FIG. 5b is a diagram showing the number of rounds according to a size of a round key of FIG. 5a;

DETAILED DESCRIPTION OF THE EMBODIMENTS

Hereinafter, embodiments according to the technical idea of the present disclosure will be described referring to the accompanying drawings.

Figure 1:
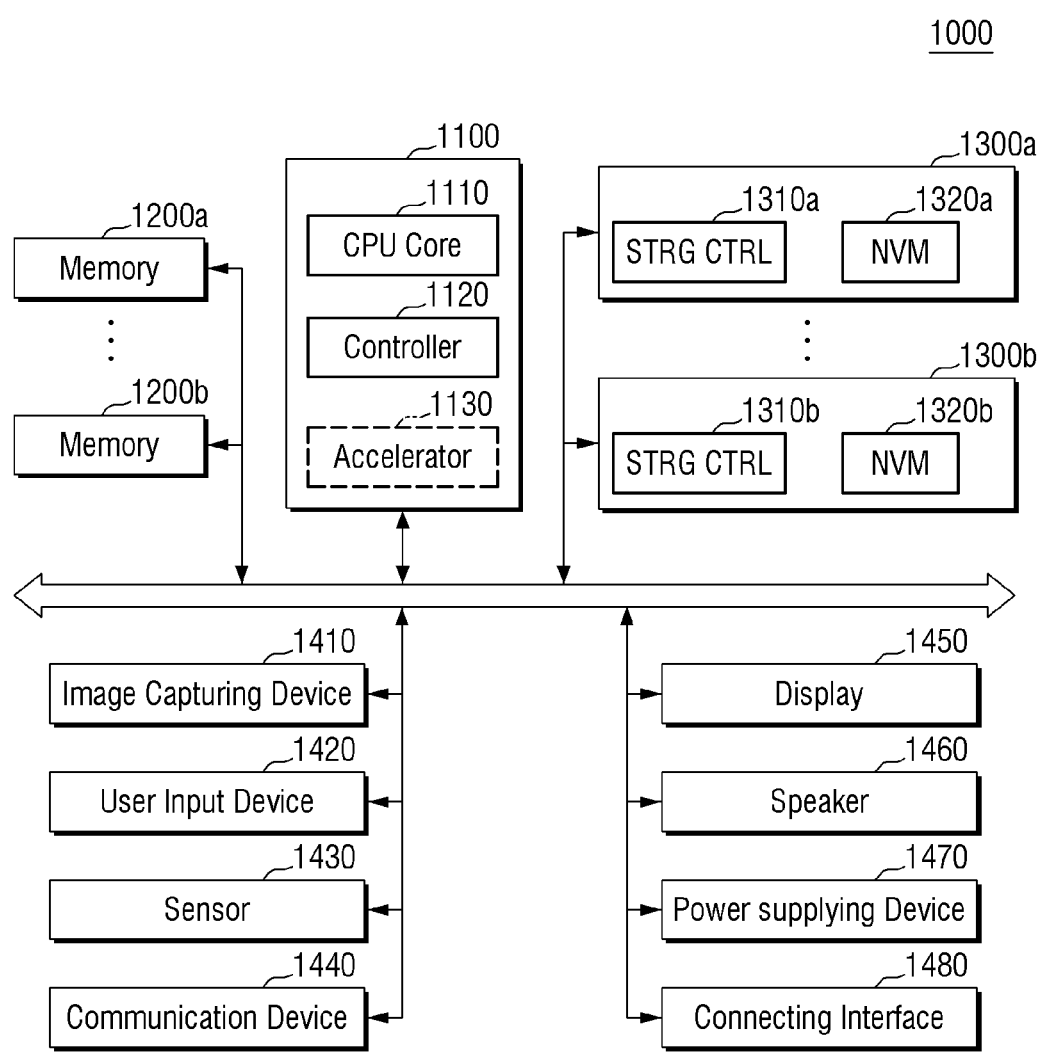
FIG. 1 is a diagram showing a system to which a storage device according to some embodiments of the present disclosure is applied.

FIG. 1 is a diagram showing a system 1000 to which a storage device according to an embodiment of the present disclosure is applied. The system 1000 of FIG. 1 may be basically a mobile system such as a mobile phone, a smart phone, a tablet PC (tablet personal computer), a wearable device, a healthcare device or an internet of things (IOT) device. However, the system 1000 of FIG. 1 is not necessarily limited to the mobile system, but may also be a personal computer, a laptop computer, a server, a media player or an automotive device such as navigation.

Referring to FIG. 1, the system 1000 may include a main processor 1100, memories 1200a and 1200b, and storage devices 1300a and 1300b, and may further include one or more of an image capturing device 1410, a user input device 1420, a sensor 1430, a communication device 1440, a display 1450, a speaker 1460, a power supplying device 1470, and a connecting interface 1480.

The main processor 1100 may control the overall operation of the system 1000, more specifically, the operation of other constituent elements constituting the system 1000. Such a main processor 1100 may be implemented by a general-purpose processor, a dedicated processor, an application processor, or the like.

The main processor 1100 may include one or more CPU cores 1110, and may further include a controller 1120 for controlling the memories 1200a, 1200b and/or the storage devices 1300a and 1300b. According to the embodiments, the main processor 1100 may further include an accelerator 1130, which is a dedicated circuit for high speed data calculations such as AI (artificial intelligence) data calculations. Such an accelerator 1130 may include a GPA (Graphics Processing Unit), an NPU (Neural Processing Unit), and/or a DPA (Data Processing Unit), and may also be implemented as a separate chip that is physically independent of other constituent elements of the main processor 1100.

The memories 1200a and 1200b may be used as a main storage device of the system 1000 and may include a volatile memory such as a SRAM and/or a DRAM, but may also include a non-volatile memory such as a flash memory, a PRAM and/or a RRAM. The memories 1200a and 1200b may also be implemented inside the same package as the main processor 1100.

The storage devices 1300a and 1300b may function as a non-volatile storage device that stores data regardless of the supply of a power source, and may have a relatively large storage capacity as compared to the memories 1200a and 1200b. The storage devices 1300a and 1300b may include storage controllers 1310a and 1310b, and non-volatile memories 1320a and 1320b (NVM) that store data under the control of the storage controllers 1310a and 1310b. The non-volatile memories 1320a and 1320b may include a flash memory of a 2D (2-dimensional) or 3D (3-dimensional) V-NAND (Vertical NAND) structure, but may include other types of non-volatile memory such as a PRAM and/or a RRAM.

The storage devices 1300a and 1300b may be included in the system 1000 in a state of being physically separated from the main processor 1100, and may be implemented inside the same package as the main processor 1100. Further, the storage devices 1300a and 1300b may have a form such as an SSD (solid state device) or a memory card, and thus may be detachably combined with other constituent elements of the system 1000 through an interface such as a connecting interface 1480 to be described later. Storage devices 1300a and 1300b may be devices to which standard protocols such as a UFS (Universal Flash Storage), an eMMC (embedded multi-media card) or an NVMe (non-volatile memory express) are applied, but are not necessarily limited thereto.

The image capturing device 1410 may capture a still image or a moving image, and may be a camera, a camcorder, and/or a webcam.

The user input device 1420 may receive various types of data that are input from users of the system 1000, and may be a touch pad, a keypad, keyboard, a mouse and/or a microphone.

The sensor 1430 may sense various types of physical quantities that may be acquired from the outside of the system 1000 and convert the sensed physical quantities into electrical signals. Such a sensor 1430 may be a temperature sensor, a pressure sensor, an illuminance sensor, a position sensor, an acceleration sensor, a bio sensor, and/or a gyroscope sensor, and the like.

The communication device 1440 may transmit and receive signals to and from other devices outside the system 1000 according to various communication protocols. Such a communication device 1440 may be implemented to include an antenna, a transceiver, and/or a modem and the like.

The display 1450 and the speaker 1460 may function as output devices that output visual and auditory information to the users of the system 1000, respectively.

The power supplying device 1470 may appropriately convert the power supplied from a battery (not shown) equipped in the system 1000 and/or an external power supply, and supply the power to each constituent element of the system 1000.

The connecting interface 1480 may provide a connection between the system 1000 and an external device that may be connected to the system 1000 to transmit and receive data to and from the system 1000. The connecting interface 1480 may be implemented in various interface types, such as an ATA (Advanced Technology Attachment), a SATA (Serial ATA), an e-SATA (external SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), an SD (secure digital) card, a MMC (multi-media card), an eMMC, a UFS, an eUFS (embedded Universal Flash Storage), and a CF (compact flash) card interface.

Figure 2:
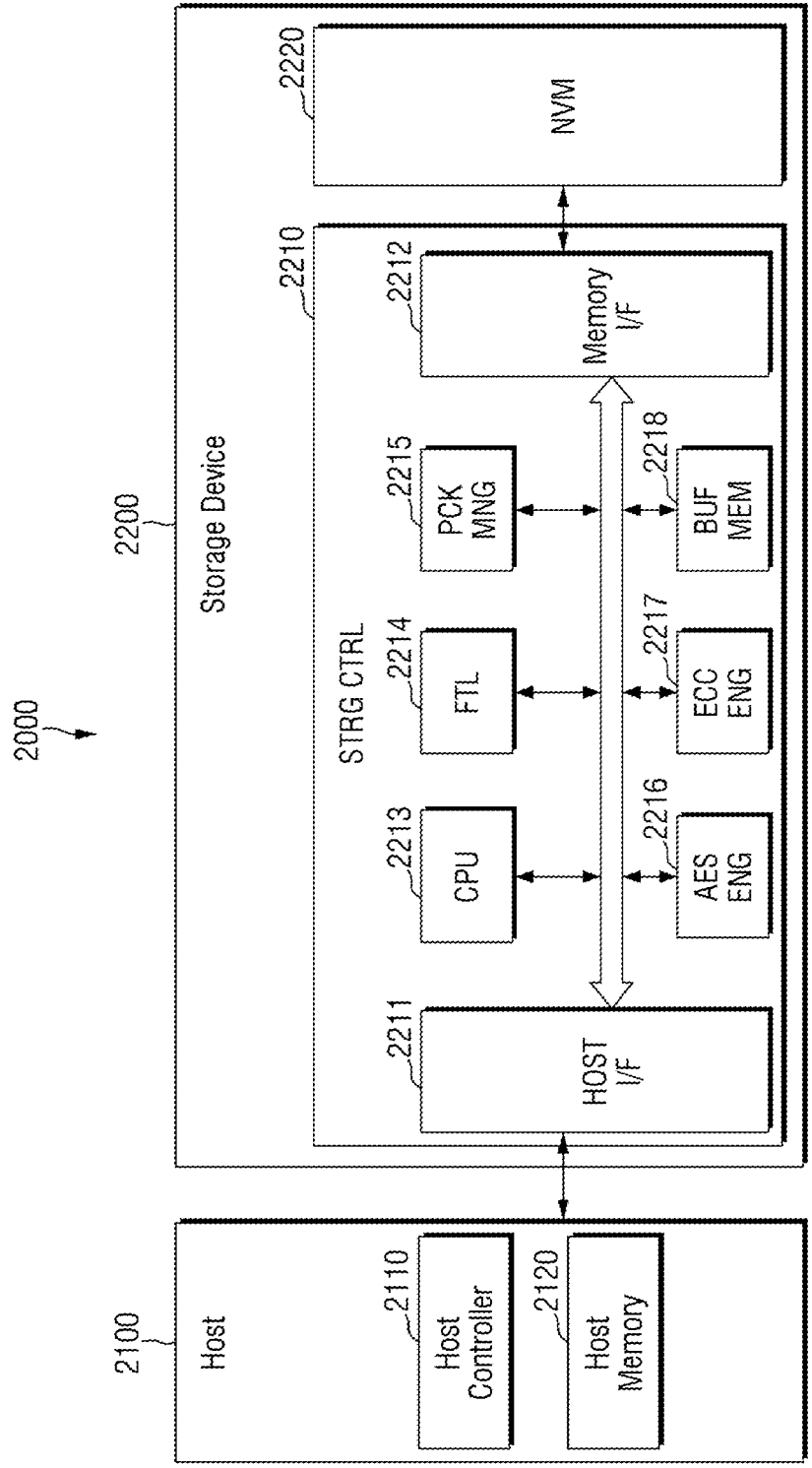
FIG. 2 is a block diagram showing a host storage system according to some embodiments of the present disclosure.

FIG. 2 is a block diagram showing a host-storage system 2000 according to some embodiments.

The host-storage system 2000 may include a host 2100 and a storage device 2200. The storage device 2200 may also include a storage controller 2210 and a non-volatile memory 2220 (NVM). Further, according to some embodiments of the present disclosure, the host 2100 may include a host controller 2110 and a host memory 2120. The host memory 2120 may function as a buffer memory for temporarily storing the data to be transmitted to the storage device 2200 or the data transmitted from the storage device 2200.

The storage device 2200 may include storage medium for storing data in response to a request from the host 2100. As an example, the storage device 2200 may include at least one of an SSD (Solid State Drive), an embedded memory, and a detachable external memory. When the storage device 2200 is an SSD, the storage device 2200 may be a device that that complies with NVMe (non-volatility memory express) standard. When the storage device 2200 is an embedded memory or an external memory, the storage device 2200 may be a device that complies with a UFS (Universal Flash Storage) or an eMMC (Embedded Multimedia Card) standard. The host 2100 and the storage device 2200 may each generate and transmit packets according to the adopted standard protocols.

When the non-volatile memory 2220 of the storage device 2200 includes a flash memory, such a flash memory may include a 2D NAND memory array or a 3D (or vertical) NAND (VNAND) memory array. As another example, the storage device 2200 may include various other types of non-volatile memories. For example, as the storage device 2200, a MRAM (Magnetic RAM), a spin-transmit torque MRAM, a Conductive bridging RAM (CBRAM), a FeRAM (Ferroelectric RAM), a PRAM (Phase RAM), a resistive memory (Resistive RAM), and various other types of memory may be applied.

According to an embodiment, the host controller 2110 and the host memory 2120 may be implemented as separate semiconductor chips. Alternatively, in some embodiments, the host controller 2110 and the host memory 2120 may be integrated on the same semiconductor chip. As an example, the host controller 2110 may be any one of a plurality of modules included in an application processor, and such an application processor may be implemented as a system on chip (SoC). Further, the host memory 2120 may be an embedded memory provided inside the application processor, or may be a non-volatile memory or a memory module placed outside the application processor.

The host controller 2110 may manage an operation of storing data (e.g., write data) of a buffer region of the host memory 2120 in the non-volatile memory 2220 or an operation of storing data (e.g., read data) of the non-volatile memory 2220 in the buffer region.

The storage controller 2210 may include a host interface 2211, a memory interface 2212, and a CPU 2213 (central processing unit). Further, the storage controller 2210 may further include a flash translation layer 2214 (FTL), a packet manager 2215, an AES engine 2216 (advanced encryption standard engine), an ECC engine 2217 (error correction code engine), and a buffer memory 2218. The storage controller 2210 may further include a working memory (not shown) into which the flash translation layer 2214 (FTL) is loaded, and the CPU 2213 may execute the flash translation layer 2214, thereby controlling the data read and write operations on the non-volatile memory 2220.

The host interface 2211 may send and receive packets to and from the host 2100. The packet transmitted from the host 2100 to the host interface 2211 may include a command or data to be written in the non-volatile memory 2220, and the packet transmitted from the host interface 2211 to the host 2100 may include a response to a command, data read from the non-volatile memory 2220, and the like. The memory interface 2212 may transmit the data to be written on the non-volatile memory 2220 to the non-volatile memory 2220 or receive the data that is read from the non-volatile memory 2220. Such a memory interface 2212 may be implemented to comply with standard protocols such as Toggle or ONFI.

The flash translation layer 2214 may perform various functions such as address mapping, wear-leveling, and garbage collection. The address mapping operation is an operation of changing a logical address received from the host 2100 into a physical address which is used for actually storing the data in the non-volatile memory 2220. The wear-leveling is a technique for allowing blocks in the non-volatile memory 2220 to be used uniformly to prevent an excessive degradation of a particular block, and may be implemented, for example, through a firmware technique of balancing the erasure counts of the physical blocks. The garbage collection is a technique for ensuring an available capacity in the non-volatile memory 2220 through a type of copying the valid data of the block to a new block and then erasing the existing block.

The packet manager 2215 may generate a packet according to the protocol of the interface discussed with the host 2100, or may parse various types of information from the packet received from the host 2100. Further, the buffer memory 2218 may temporarily store the data to be recorded in the non-volatile memory 2220 or the data to be read from the non-volatile memory 2220. The buffer memory 2218 may be configured to be provided inside the storage controller 2210, but may be placed outside the storage controller 2210.

The ECC engine 2217 may perform error detection and correction functions on the read data that is read from the non-volatile memory 2220. More specifically, the ECC engine 2217 may generate parity bits on the write data to be written on the non-volatile memory 2220, and the parity bits thus generated may be stored in the non-volatile memory 2220 together with the write data. When reading the data from the non-volatile memory 2220, the ECC engine 2217 may correct an error of the read data, using the parity bits that are read from the non-volatile memory 2220 together with the read data, and output the read data with a corrected error.

The AES engine 2216 may perform at least one of encryption and decryption operations of the data which are input to the storage controller 2210, using a symmetric-key algorithm. In some embodiments, the AES engine 2216 may be placed closer to the host interface 2211 than to the memory interface 2212, as shown in FIG. 2.

Hereinafter, the encryption/decryption device 10 according to some embodiments of the present disclosure will be described. As used herein, the term "core" may refer to a module that performs encryption or decryption, using a block cipher algorithm that performs encryption or decryption in block units. For example, the core may perform encryption or decryption, using a block cipher algorithm such as an algorithm that complies with a DES (Data Encryption Standard), a 3DES, an AES (Advanced Encryption Standard) or a SEED. The block cipher algorithm is distinguished from a stream cipher algorithm such as a LFSR (Linear Feedback Shift Register) that performs encryption in bit units. The core may include an encryption/decryption core 230, a CTS core 430, a tweak core unit 500, and the like of FIG. 3. Although each core may be made up of separate modules, the CPU 2213 of FIG. 2 may also play the role of a core or a multi-core unit with multiple cores.

Figure 3:
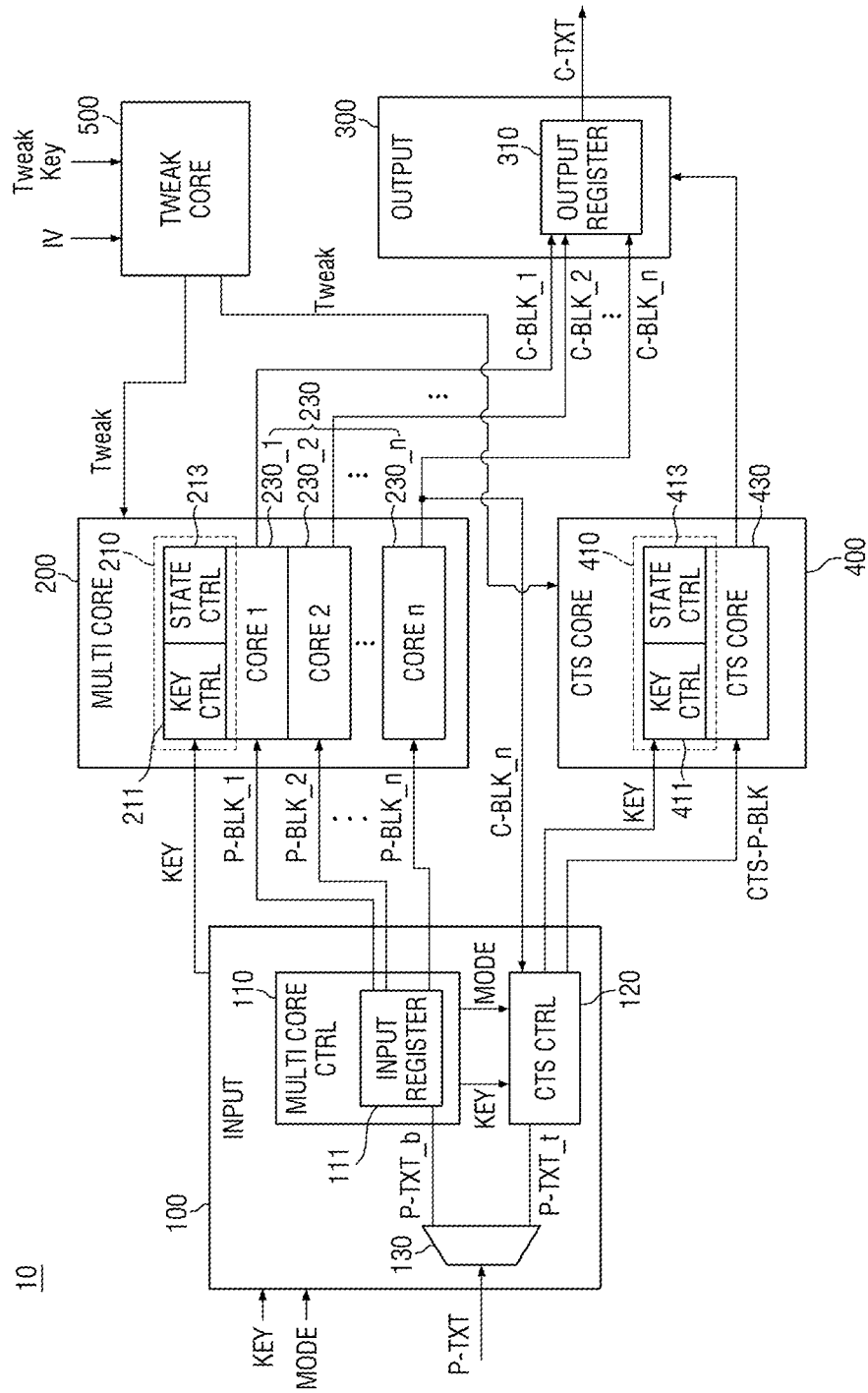
FIG. 3 is a block diagram showing an encryption/decryption device according to some embodiment of this disclosure.

FIG. 3 is a block diagram which shows the encryption/decryption device according to some embodiment of this disclosure.

Referring to FIG. 3, the encryption/decryption device 10 may include an input unit 100, a multi-core unit 200, an output unit 300, a CTS core unit 400 (Cipher Text Stealing core unit), and a tweak core unit 500.

Before proceeding, it should be clear that Figures herein, including FIG. 3, show and reference circuitry with labels such as "unit", or similar terms analogous to "circuit" or "block". As is traditional in the field of the inventive concept(s) described herein, examples may be described and illustrated in terms of such labeled elements which carry out a described function or functions. These labeled elements, or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting such labeled elements may be implemented by dedicated hardware, or by a processor (e.g., one or more programmed microprocessors and associated circuitry), or by a combination of dedicated hardware to perform some functions of the labeled element and a processor to perform other functions of the labeled element. Each labeled element of the examples may be physically separated into two or more interacting and discrete circuits without departing from the scope of the present disclosure. Likewise, the labeled elements of the examples such as in the encryption/decryption device 10 of FIG. 3 may be physically combined into more complex circuits without departing from the scope of the present disclosure.

The input unit 100 may include a multi-core control unit 110, a CTS control unit 120, and a distributor 130. A key KEY and a mode signal MODE may be provided to the input unit 100. Further, the input unit 100 may be provided with a plain text P-TXT. The plain text P-TXT may be a plain text main body which is data except for a plain text tail P-TXT_t in the plain text.

The distributor 130 is provided with the plain text P-TXT, divides it into a plain text body P-TXT_b and a plain text tail P-TXT_t, and may provide the plain text body P-TXT_b to the multi-core control unit 110, and provide the plain text tail P-TXT_t to the CTS control unit 120.

The input unit 100 is provided with a mode signal MODE, and may operate based on the mode signal MODE. The mode signal MODE may control the encryption/decryption core and the CTS core to select one of a plurality of encryption calculation modes and operate according to the selected mode. The calculation mode includes an ECB (Electronic Code Book), a CTS (Cipher Text Stealing), an XEX (Xor-E-Xor), and an XTS (XEX-based tweaked-codebook mode with cipher text stealing). The mode signal MODE may also determine whether the plain text P-TXT is divided into block units, and control the operation of the input unit 100 according to the determination. For example, when the plain text P-TXT is divided into block units, the mode signal MODE may control the distributor 130 to provide the plain text P-TXT to the multi-core control unit 110 without dividing it. On the other hand, when the plain text P-TXT is not divided into block units, the mode signal MODE may control the distributor 130 to divide the plain text P-TXT into the plain text body P-TXT_b and the plain text tail P-TXT_t. That is, the mode signal MODE may control the input unit 100 to generate a CTS plain block CTS-P-BLK to be described later through the CTS calculation described later, when the plain text P-TXT is not a multiple of the block unit.

The key KEY may be an encryption key for generating a round key, when encryption is performed by the AES algorithm to be described later. The size of the KEY may be 128 bits, 192 bits, or 256 bits. When the size of the key KEY is 128 bits, 192 bits, or 256 bits, respectively, the AES algorithm may be referred to as AES-128, AES-192, or AES-256, respectively.

The plain text P-TXT may be input through a bus (not labeled) shown in FIG. 2. The bus may transmit data in units of a specified size. Therefore, the plain text P-TXT may be continuously transmitted to the encryption/decryption device in the size specified by the bus interface.

When the plain text P-TXT is distributed to a plurality of plain blocks P-BLK, a header of each plain block P-BLK may include information about the distribution, for example, information indicating which place the plain block P-BLK is in a sequential order of the data of the plain text P-TXT input to the input unit 100. In addition, that information may also be included in the header of the cipher block C_BLK generated by encrypting the plain block P-BLK.

The multi-core control unit 110 may include an input register 111. The input register 111 is provided with the plain text body P-TXT_b from the distributor 130, and may store it by dividing in block units. The block units divided from the plain text body P-TXT_b may each be referred to as a plain block P-BLK. That is, the data of the block units obtained by dividing the plain text P-TXT input to the input unit 100 into the block units is called a plain block P-BLK, and the plain text body P-TXT_b may be the same as the sum of the plain blocks P-BLK. In some embodiments, the block units may be 16 bytes.

In this case, the plain text tail P-TXT_t may be data corresponding to the part of the plain text P-TXT other than the plain text body (P-TXT_b) when the plain text P-TXT is divided into block units. For example, when the plain text main body P-TXT is data of 50 bytes and the block unit is 16 bytes, the plain text body P-TXT_b is data corresponding to the front 48 bytes of the plain text P-TXT, and the plain text tail P-TXT_t may be data corresponding to the last 2 bytes of the plain text P-TXT.

The CTS control unit 120 is provided with the plain text tail P-TXT_t, and may store the plain text tail P-TXT_t. The CTS control unit 120 may receive the key KEY and the mode signal MODE from the multi-core control unit 110 and operate based on the key KEY and the mode signal MODE. Further, the CTS control unit 120 is provided with an $n^{th}$ cipher block C-BLK_n to be described later, and may generate a CTS plain block CTS-P-BLK to be described later through a CTS calculation based on the $n^{th}$ cipher block C-BLK_n. Contents of the CTS calculation will be described in detail later.

The multi-core unit 200 may include an encryption/decryption core control unit 210 and a plurality of encryption/decryption cores 230.

The encryption/decryption core control unit 210 may include a key control unit 211 and a state control unit 213. The key control unit 211 is provided with the key KEY from the input unit 100, and may generate a round key to be described later based on the key KEY. A round key generation process of the key control unit 211 will be described later. The state control unit 213 may generally control the encryption operation of the encryption/decryption cores 230. Further, the encryption/decryption core control unit 210 may further include a key storage unit (not shown). The key storage unit (not shown) may be implemented by a register or the like. The key storage unit (not shown) may store a round key, which will be described later. The key storage unit (not shown) may be included in the encryption/decryption core control unit 210, or may be provided outside the encryption/decryption core control unit 210.

Each of the plurality of encryption/decryption cores 230 may encrypt the plain blocks P-BLK under the control of the state control unit 213. For example, among the plain blocks P-BLK generated by dividing the plain text P-TXT, a first plain block P-BLK_1 may be provided to the first encryption/decryption core 230_1. A second plain block P-BLK_2 may be provided to the second encryption/decryption core 230_2. Similarly, an $n^{th}$ plain block P-BLK_n may be provided to the $n^{th}$ encryption/decryption core 230_n. That is, when the plain text body P-TXT_b is divided into n plain blocks P-BLK, each of the n plain blocks P-BLK may be provided to each of the n encryption/decryption cores 230 and encrypted. In some embodiments, each encryption/decryption core 230 may be synchronized with one or more of the others based on the control of state control unit 213 and initiate encryption simultaneously.

The output unit 300 is provided with a plurality of cipher blocks C_BLK in which the plain blocks P-BLK are encrypted, and a CTS cipher block CTS-C-BLK (not shown in FIG. 3) in which the CTS plain blocks CTS-P-BLK are encrypted, and may output cipher text C-TXT based on them. The output unit 300 may sequentially add the cipher blocks C_BLK based on the header(s) by referring to the header of each provided cipher block C_BLK, and output the cipher text C-TXT. The output unit 300 may include an output register 310. The output register 310 may temporarily store the cipher blocks C_BLK, which are generated from the multi-core unit 200 after completion of encryption, before being output to form the cipher text C-TXT.

The CTS core unit 400 may include a CTS core control unit 410 and a CTS core 430. The CTS core unit 400 may be physically separated from the multi-core unit 200. The CTS core control unit 410 may include a CTS key control unit 411, and a CTS state control unit 413. The CTS key control unit 411 is provided with the key KEY from the CTS control unit 120, and may generate a round key based on the key KEY. The CTS state control unit 413 may generally control the encryption operation of the CTS core 430. The CTS key control unit 411 and the CTS control unit 120 may be the same as or similar to each of the key control unit 211 and the state control unit 213 of the multi-core unit 200.

In some embodiments, the CTS core 430 may be made up of a plurality of cores. Although FIG. 3 shows that the CTS core 430 is a single core, the present disclosure is not limited thereto. The CTS core 430 may have a structure that is the same as or similar to that of the multi-core unit 200.

The tweak core unit 500 is provided with an initial vector IV and a tweak key KEY, and may generate a tweak on the initial vector IV and the tweak key KEY. The tweak is provided to the multi-core unit 200 and the CTS core unit 400, and may be used in the encryption process of an XEX (Xor-E-Xor) mode of the encryption/decryption core 230 to be described later.

Figure 4:
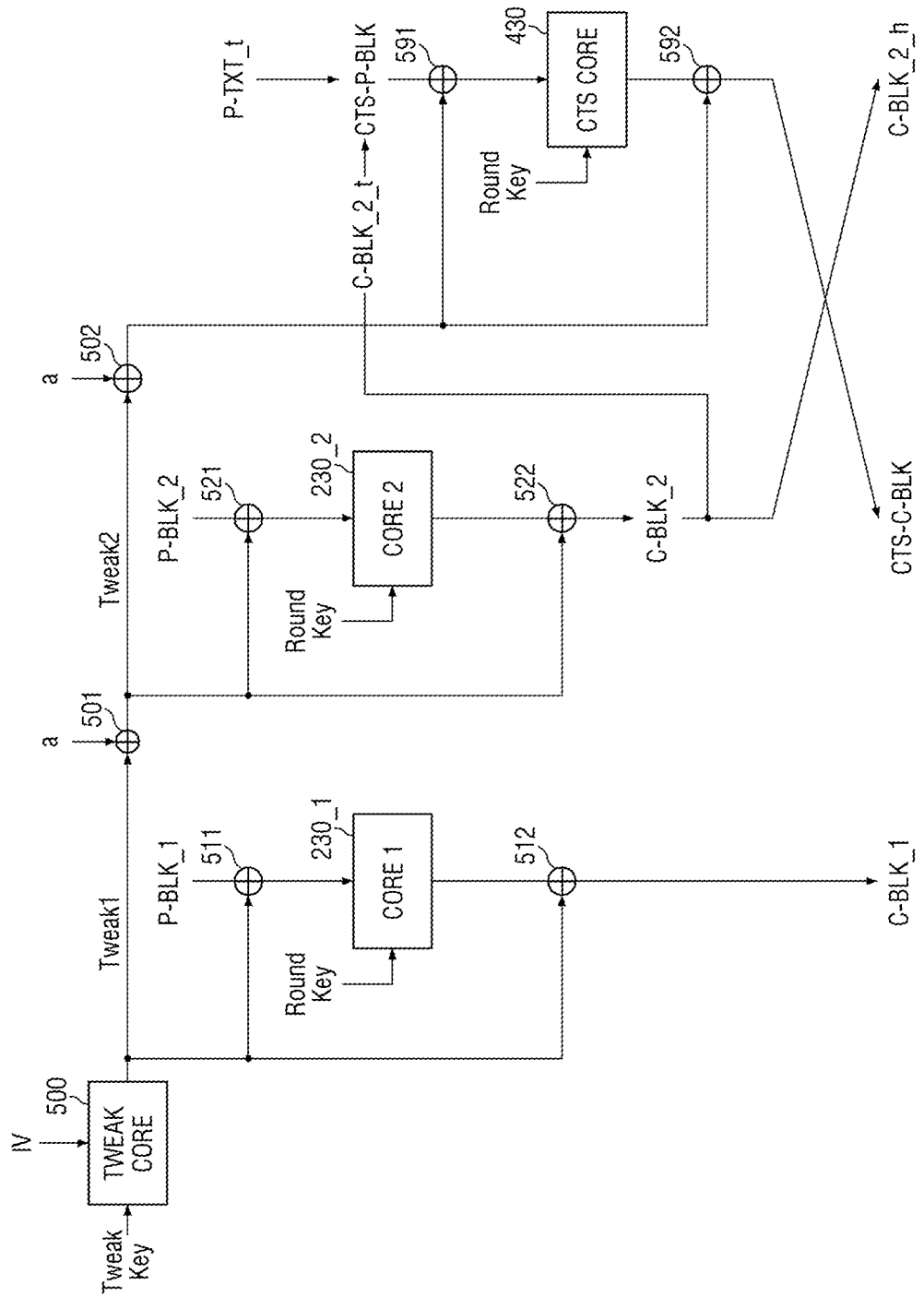
FIG. 4 is a diagram for explaining an encryption process of an XTS (XEX-based tweaked-codebook mode with cipher text staling mode according to some embodiments of the present disclosure.

FIG. 4 is a diagram for explaining the encryption process of XTS (XEX-based tweaked-codebook mode with cipher text stealing) mode according to some embodiments of the present disclosure.

Referring to FIG. 4, the data may be encrypted in XTS (XEX-based tweaked-codebook mode with cipher text stealing) mode. As mentioned above, the XTS mode is an operation mode of the encryption/decryption device 10 when the plain text P-TXT is not divided into block units. That is, an operation will be described in a case where the plain text P-TXT is divided into the plain text body P-TXT_b and the plain text tail P-TXT_t, the plain text body P-TXT_b is divided into the plain blocks P-BLK again and provided to each encryption/decryption core 230, and the plain text tail P-TXT_t is provided to the CTS control unit 120. Although FIG. 4 shows that the multi-core unit 200 includes only the first encryption/decryption core 230_1 and the second encryption/decryption core 230_2, the present disclosure is not limited thereto, and is also applicable to a case where the multi-core unit 200 includes various number of encryption/decryption cores 230.

First, the first plain block P-BLK_1 is subjected to exclusive OR with the first tweak Tweak1 in the first calculator 511 and input to the first encryption/decryption core 230_1. The first encryption/decryption core 230_1 is provided with a round key, and encrypts the exclusive OR result data of the input first plain block P-BLK_1 based on the round key. The encryption process may be performed via multiple rounds. The encryption operation of the first encryption/decryption core 230_1 will be described in detail later. The output and encrypted exclusive OR result data of the first plain block P-BLK_1 is again subjected to exclusive OR with the first tweak Tweak1 in the second calculator 512, and output to a first cipher block C-BLK_1. That is, in the process of encrypting the first plain block P-BLK_1 into the first cipher block C-BLK_1, the tweaking may be performed twice before and after the data is input to a first encryption/decryption core 230_1.

Similarly, the second plain block P-BLK_2 is subjected to exclusive OR with the second tweak Tweak2 in a third calculator 521 and input to a second encryption/decryption core 230_2. The second tweak Tweak2 is generated by exclusive-OR of the first tweak Tweak1 with an initial value (a) in the first tweak calculator 501. The operations of the second encryption/decryption core 230_2 and a fourth calculator 522 may be the same as or similar to each of the operations of the first encryption/decryption core 230_1 and the second calculator 512. That is, the second plain block P-BLK_2 is encrypted into the second cipher block C-BLK_2 via two exclusive ORs with the Tweak2. As described above, the first encryption/decryption core 230_1 and the second encryption/decryption core 230_2 may perform encryption in synchronization with each other under the control of the state control unit 213.

After the encryption of the second encryption/decryption core 230_2 is finished, that is, after the second cipher block C-BLK_2 is generated, the second cipher block C-BLK_2 is divided into a second cipher block head C-BLK_2_h and a second cipher block tail C-BLK_2_t. The second cipher block tail C-BLK_2_t is provided to the CTS control unit 120. Further, the CTS control unit 120 may be provided with the plain text tail P-TXT_t from the distributor 130 of FIG. 3. The CTS control unit 120 generates a CTS plain block CTS-P-BLK by adding the second cipher block tail C-BLK_2_t and the plain text tail P-TXT_t. In the present specification, the addition calculation of the second cipher block tail C-BLK_2_t and the plain text tail P-TXT_t for generating the CTS plain block CTS-P-BLK may be referred to as a "CTS calculation".

The CTS plain block CTS-P-BLK is subjected to exclusive OR with the third tweak Tweak3 in a fifth calculator 591 and input to the CTS core 430. The third tweak Tweak3 is generated by exclusive-OR of the second tweak Tweak2 with the initial value (a) in the second tweak calculator 502. The CTS core 430 is provided with the round key and encrypts the input exclusive OR result data of the CTS plain block CTS-P-BLK based on the round key. The output and encrypted exclusive OR result data of the CTS plain block CTS-P-BLK is subjected to exclusive OR with the third tweak Tweak3 again in the sixth calculator 592, and is output to the CTS cipher block CTS-C-BLK. That is, in the process of encrypting the CTS plain block CTS-P-BLK with the CTS cipher block CTS-C-BLK, the data may undergo two exclusive ORs with the third tweak Tweak3, one before and one after being input to the CTS core 430.

The cipher text C-TXT shown in FIG. 3 may be output, by combining the first cipher block C-BLK_1, the second cipher block head C-BLK_2_h, and the CTS cipher block CTS-C-BLK based on the headers by referring to the headers of the first cipher block C-BLK_1, the second cipher block head C-BLK_2_h, and the CTS cipher block CTS-C-BLK generated via the aforementioned process. In some embodiments, the order of the second cipher block head C-BLK_2_h and the CTS cipher block CTS-C-BLK may change to intersect each other. That is, the second cipher block head C-BLK_2_h is generated before the CTS cipher block CTS-C-BLK, but the CTS cipher block CTS-C-BLK may be placed in front of the second cipher block head C-BLK_2_h in the cipher text C-TXT to be output finally. By changing the order of the second cipher block head C-BLK_2_h and the CTS cipher block CTS-C-BLK to intersect each other, it is possible to make the attack on the cipher text C-TXT more difficult.

Next, a process of encrypting the plain block P-BLK with the AES algorithm to generate the cipher block C-BLK will be described referring to FIG. 5a and FIG. 5b. For convenience of explanation, although the plain block P-BLK has a size of 16 bytes and a round key has a size of 256 bits (i.e., AES-256) as an example, it should be noted that the present disclosure is not limited thereto. Further, the encryption/decryption core 230 shown in FIG. 5a may be any one of the plurality of encryption/decryption cores including the first encryption/decryption core 230_1, the second encryption/decryption core 230_2, . . . to the nth encryption/decryption core 230_n shown in FIG. 3.

Figure 5A:
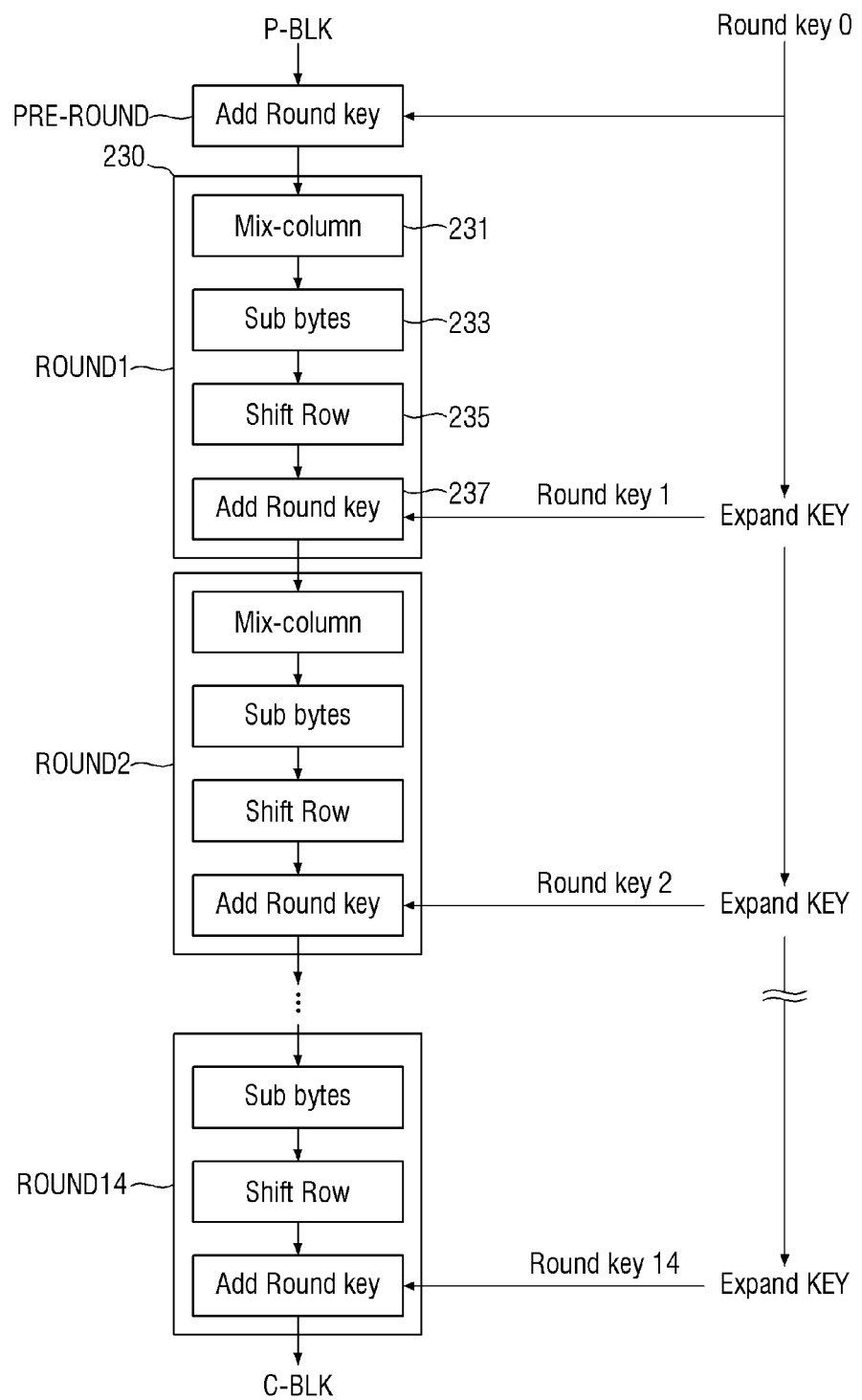
FIG. 5a is a diagram schematically showing that an encryption/decryption core of FIG. 2 performs encryption by an AES (Advanced Encryption Standard) algorithm.

FIG. 5a is a diagram schematically showing that the encryption/decryption core of FIG. 2 performs encryption by the AES (Advanced Encryption Standard) algorithm. The encryption/decryption core 230 of FIG. 5a may encrypt the plain block P-BLK via one pre-round PRE-ROUND and fourteen rounds ROUND1 to ROUND14.

The pre-round PRE-ROUND performs exclusive OR of the plain block P-BLK with the initial round key Round key 0. The initial round key Round key 0 that is input to the pre-round PRE-ROUND of FIG. 5a may be the same as the key KEY. Alternatively, the initial round key Round key 0 may be a key in which the key KEY is subjected to exclusive OR with the initial value (not shown) in the key control unit 211. Further, the exclusive OR in the pre-round PRE-ROUND may be the same as a calculation Add Round key to be described later.

Each of the fourteen rounds ROUND1 to ROUND14 is subjected to exclusive OR with the round keys Round key 1 to Round key 14 that are unique to each round, after confusion and diffusion of the encryption calculation results of the previous stage rounds (or pre-round). The confusion makes a relationship between data blocks of consecutive rounds obscure, and diffusion means distribution of the patterns of the data blocks. The size of the plain block P-BLK of FIG. 5a is 16 bytes. When the sizes of the round key are 128 bits, 192 bits, and 256 bits, respectively, the AES algorithm may be named AES-128, AES-192, and AES-256, respectively. The number of rounds varies depending on the size of the round key.

The four calculations of the Mix-column, Sub Bytes, Shift Row, and Add Round keys shown in FIG. 5a may be performed by a Mix-column module 231, a Sub Bytes module 233, a Shift Row module 235, and an Add Round key module 237, respectively. Alternatively, the four calculations of the Mix-column, Sub Bytes, Shift Row, and Add Round key may be implemented as software, respectively.

FIG. 5b is a diagram showing the number of rounds according to the size of the round key of FIG. 5a. Referring to FIG. 5a and FIG. 5b, in the case of AES-128, the size of the round key is 128 bits and ten rounds proceed. In the case of AES-192 and AES-256, the size of the round key is 192 bits and 256 bits, respectively, and twelve and fourteen rounds proceed, respectively. The pre-round PRE-ROUND of FIG. 5a is not included in the number of rounds. However, the block sizes of all of AES-128, AES-192, and AES-256, that is, the size of the plain block P-BLK is the same 16 bytes.

Referring to FIG. 5a again, each of the rounds ROUND1 to ROUND14 sequentially perform four calculations of Mix-column, Sub Bytes, Shift Row, and Add Round Key to perform the aforementioned operations. However, in the round 14 which is the final round, the calculation Mix Column may be omitted. The calculation Sub-Bytes involves scrambling each byte of the data block so that the cipher block C-BLK obtained by encrypting the plain block P-BLK does not have a linear structure. The data block is 16 bytes and may be represented by a 4×4 matrix having element values with a byte size. The calculation Sub Byte may be performed by expressing each byte of the data block as a polynomial on a Galois field of $GF(2^8)$ to obtain a reciprocal, and then performing the affine transformation in $GF(2)$.

The calculation Shift Row is performed by shifting each row of the data block by a certain number. The calculation Mix-Column scrambles the elements of each column of the data block. The calculation Mix-Column may be performed by expressing each column of the data block as a third-degree polynomial with four terms, multiplying it by the polynomial on mod $x^4+1$ and expressing it as a matrix multiplication. The confusion and diffusion are performed on the above-mentioned data blocks, by performing the calculation Sub Byte, the calculation Shift Row, and the calculation Mix-Column. The calculation AD Round Key is performed by performing exclusive OR of the elements (bytes) of the data block and the round key.

From Round 1 to Round 13, as described above, four calculations of Sub bytes, Shift Row, Mix-Column, and Add Round key are sequentially performed on the data block. Three calculations of Sub bytes, Shift Row, and Add Round key except for the calculation Mix-Column are sequentially performed on Round 14, which is a final round. The initial round key Round key 0 is shown in a table of A.1 of Appendix A of FIPS-197 that is the AES standard.

In AES-128, the round key generated in the previous round is expanded and the round key of the next round is generated. That is, the initial round key Round key 0 is expanded to generate the first round key Round key 1 (Expand KEY in FIG. 5a). The first round key Round key 1 is expanded to generate a second round key Round key 2 (Expand KEY in FIG. 5a). Therefore, a fourteenth round key Round key 14 used in the final round ROUND 14 from which the cipher block C-BLK is output may be generated only when all the other round keys (Round key 1 to Round keys 13) are calculated. As described above, each round key (Round key 1 to Round key 14) may be generated (that is, expanded) by the key control unit 211 of FIG. 3 and applied to each encryption/decryption core 230.

Figure 6:
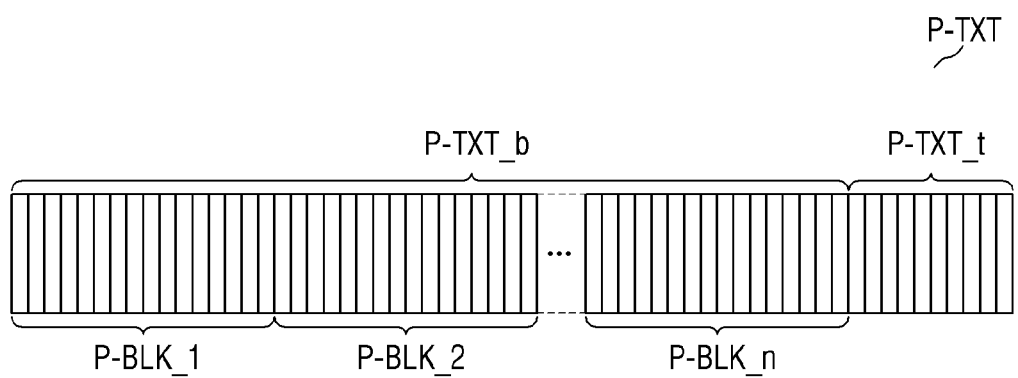
FIG. 6 is a diagram schematically showing a plain text provided to an input unit of FIG. 3.
Figure 11:
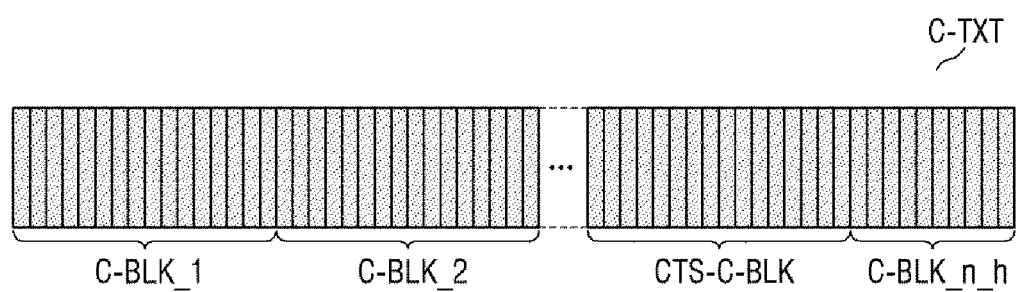
FIG. 11 and FIG. 12 are diagrams exemplarily showing a cipher text that is output from an output unit of FIG. 3.
Figure 12:
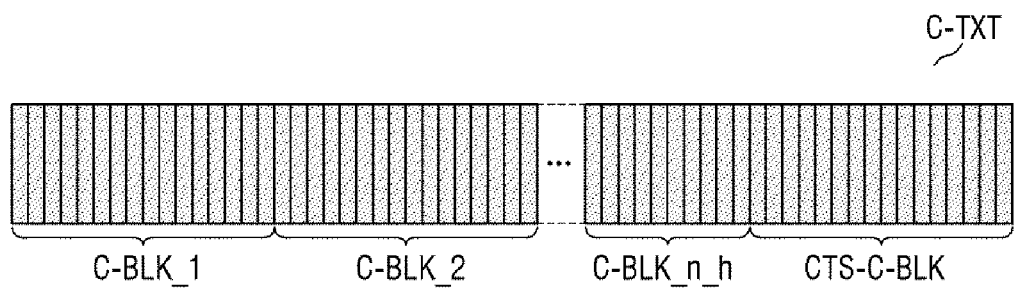

FIG. 6 is a diagram schematically showing the plain text provided to the input unit of FIG. 3. FIG. 7, FIG. 8, FIG. 9 and FIG. 10 are diagrams for explaining a CTS (Cipher Text Stealing) calculation process according to some embodiments of the present disclosure. FIG. 11 and FIG. 12 are diagrams exemplarily showing the cipher text that is output from the output unit of FIG. 3. Hereinafter, although the plain text P-TXT is shown as an example for explaining the above-mentioned CTS calculation, it should be noted that this is for convenience of explanation. Hereinafter, for convenience of explanation, it is assumed that one rectangular block shown in FIG. 6 to FIG. 12 shows one byte of data. Further, the block unit means 16 bytes.

First, referring to FIG. 6, the plain text P-TXT may be divided into a plain text body P-TXT_b and a plain text tail P-TXT_t. The plain text body P-TXT_b is divided into block units again, and may be divided into a first plain block P-BLK_1, a second plain block P-BLK_2, . . . and an $n^{th}$ plain block P-BLK_n. That is, each plain block P-BLK shown in FIG. 6 has a size of 16 bytes. Also, in FIG. 6, the plain text tail P-TXT_t has a size of 10 bytes, which is smaller than 16 bytes. That is, the plain text P-TXT has a size of 16n+10 bytes. Although FIG. 6 shows that the plain text tail P-TXT_t has a size of 10 bytes, the size by which the plain text tail P-TXT_t is divided from the plain text P-TXT is an example, and one of ordinary skill in the relevant art(s) may recognize that the plain text tail P-TXT_t may have a size of 1 byte or more and 15 bytes or less when the block unit is 16 bytes.

Figure 7:
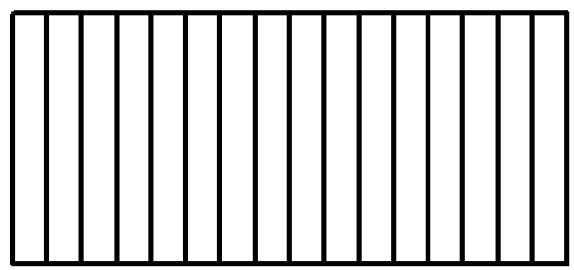
FIG. 7, FIG. 8, FIG. 9 and FIG. 10 are diagrams for explaining a CTS (Cipher Text Stealing) calculation process according to some embodiments of the present disclosure.
Figure 8:
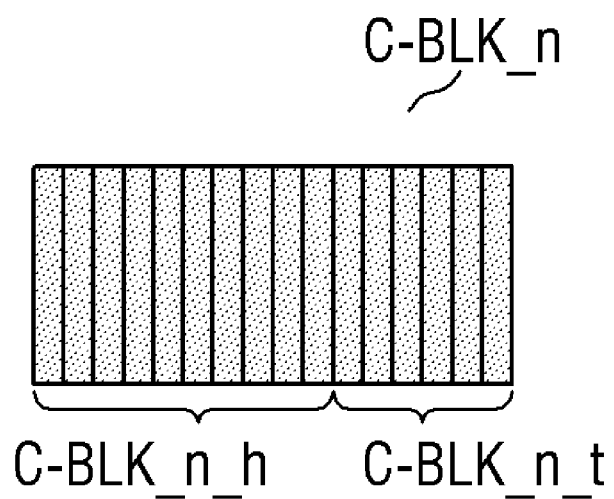

FIG. 7 is a diagram showing the $n^{th}$ plain block P-BLK_n of FIG. 6. Referring to FIG. 7 and FIG. 8, the $n^{th}$ plain block P-BLK_n of FIG. 7 is encrypted into the $n^{th}$ cipher block C-BLK_n of FIG. 8 via an encryption process. The $n^{th}$ cipher block is divided into an $n^{th}$ cipher block head C-BLK_n_h and an $n^{th}$ cipher block tail C-BLK_n_t for CTS calculation. In this case, the $n^{th}$ cipher block head C-BLK_n_h needs to have the same size as that of the plain text tail P-TXT_t shown in FIG. 6. That is, the size of the $n^{th}$ cipher block head C-BLK_n_h is 10 bytes. Further, the size of the $n^{th}$ cipher block tail C-BLK_n_t is 6 bytes.

Figure 9:
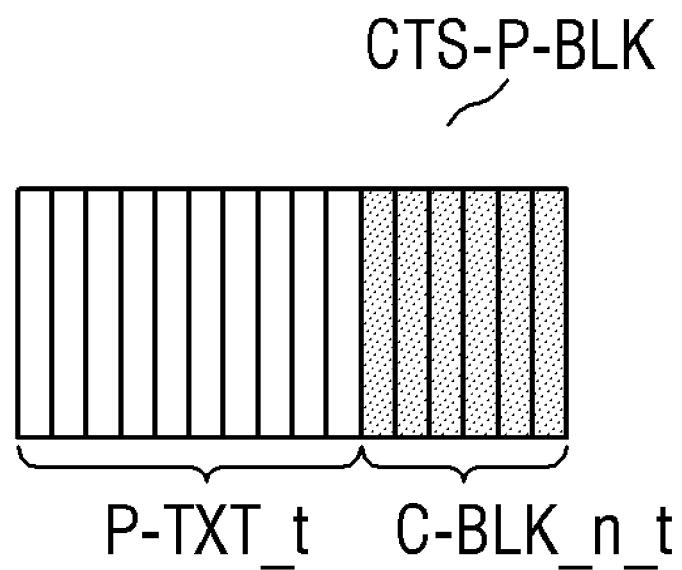
Figure 10:
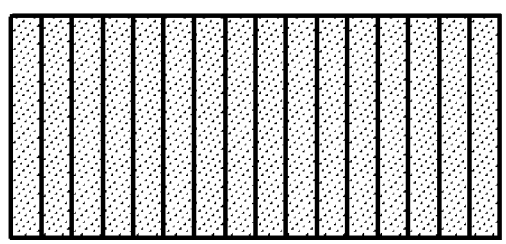

Next, referring to FIG. 3, FIG. 9 and FIG. 10, the plain text tail P-TXT_t and the $n^{th}$ cipher block tail C-BLK_n_t are added in the CTS control unit 120 of FIG. 3 to generate a CTS plain block CTS-P-BLK (shown in FIG. 9). Because the size of the plain text tail P-TXT_t is 10 bytes and the size of the $n^{th}$ cipher block tail C-BLK_n_t is 6 bytes, the CTS plain block CTS-P-BLK generated by addition of the plain text tail P-TXT_t and the $n^{th}$ cipher block tail C-BLK_n_t has a size of 16 bytes. The CTS plain block CTS-P-BLK is input to the CTS core 430 of FIG. 3 and encrypted into the CTS cipher block CTS-C-BLK (shown in FIG. 10). The generated CTS cipher block CTS-C-BLK is stored in the output register 310 of FIG. 3, is added to other cipher blocks C_BLK, and is output to the cipher text C-TXT.

Referring to FIG. 11, the cipher text C-TXT may be output by sequentially adding the first cipher block C-BLK_1, the second cipher block C-BLK_2, . . . the $n-1^{th}$ cipher block C-BLK_n-1, the CTS cipher block CTS-C-BLK and the $n^{th}$ cipher block head C-BLK_n_h. Although the CTS cipher block CTS-C-BLK is generated to be later than the $n^{th}$ cipher block head C-BLK_n_h, the arrangement order of the CTS cipher block CTS-C-BLK and the $n^{th}$ cipher block head C-BLK_n_h may be changed from each other to make an attack on the cipher text C-TXT difficult.

Referring to FIG. 12, unlike FIG. 11, the cipher text C-TXT may be output by sequentially adding the first cipher block C-BLK_1, the second cipher block C-BLK_2, . . . the $n-1^{th}$ cipher block C-BLK_n-1, the $n^{th}$ cipher block head C-BLK_n_h, and the CTS cipher block CTS-C-BLK.

Figure 13:
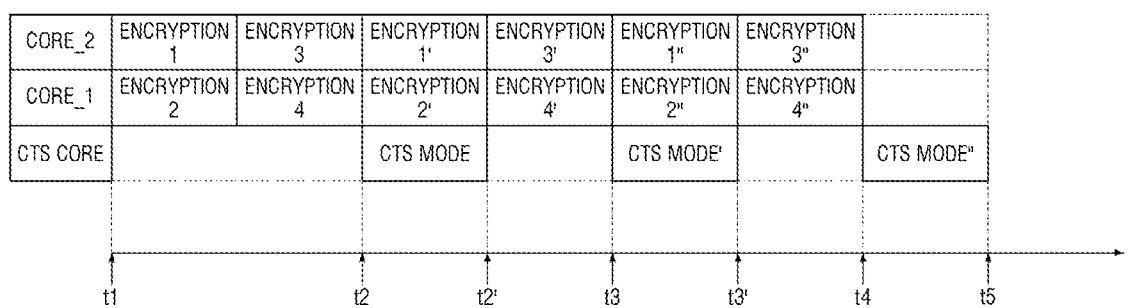
FIG. 13 is a diagram for explaining a pipe-line operation of an encryption/decryption device of FIG. 3.

FIG. 13 is a diagram for explaining the pipe-line operation of the encryption/decryption device of FIG. 3. FIG. 13 schematically shows an encryption process of each plain text when the first plain texts to third plain texts are sequentially input. For convenience of explanation, it is assumed that the size of each plain text to be input to the encryption/decryption device 10 is 60 bytes. Although FIG. 13 shows that the encryption/decryption device 10 of FIG. 3 only includes the first encryption/decryption core 230_1, the second encryption/decryption core 230_2, and the CTS core 430, this is for convenience of explanation, and the disclosure is not limited thereto.

Referring to FIG. 3 and FIG. 13, before a time point t1, the first plain text P-TXT_1 is divided into the first plain blocks to fourth plain blocks P-BLK1, P-BLK2, P-BLK3 and P-BLK4 and the first plane text tail P-TXT_1_t. At the time point t1, the first encryption/decryption core 230_1 starts encryption of the first plain block P-BLK_1 (ENCRYPTION 1), and the second encryption/decryption core 230_2 starts encryption of the second plain block P-BLK_2 in synchronization with the first encryption/decryption core 230_1 (ENCRYPTION 2). When the encryption of the first plain block P-BLK_1 and the second plain block P-BLK_2 is completed, the generated first cipher block C-BLK_1 and the second cipher block C-BLK_2 are transmitted to the output register 310 of FIG. 3, the first encryption/decryption core 230_1 starts encryption of the third plain block P-BLK_3 (ECRYPTION 3), and the second encryption/decryption core 230_2 starts encryption of the fourth plain block P-BLK_4 (ENCRYPTION 4).

At a time point t2, when the encryption of the third plain block P-BLK_3 and the fourth plain block P-BLK_4 is completed, the generated third cipher block C-BLK_3 is transmitted to the output register 310 of FIG. 3, and the fourth cipher block C-BLK_4 is transmitted to the CTS control unit 120 of FIG. 3. The CTS control unit 120 divides the fourth cipher block C-BLK_4 to generate a fourth cipher block head C-BLK_4_h and a fourth cipher block tail C-BLK_4_t. Further, the CTS control unit 120 adds the first plain text tail P-TXT_1_t and the fourth cipher block tail C-BLK_4_t to generate the first CTS plain block CTS-P-BLK_1, and provides them to the CTS core 430. The CTS core 430 is provided with the first CTS plain block CTS-P-BLK_1 and starts encryption of the first CTS plain block CTS-P-BLK_1 at the second time point t2 (CTS MODE). At the same time, at the time point t2, the first encryption/decryption core 230_1 starts encryption of a fifth plain block P-BLK_5 generated by division of the second plain text P-TXT (ENGRYPTION 1'), and the second encryption/decryption core 230_2 starts encryption of the sixth plain block P-BLK_6 in synchronization with the first encryption/decryption core 230_1 (ENGRYPTION 2').

When the encryption of the first CTS plain block CTS-P-BLK_1 is completed at the time point t2', that is, when the CTS MODE is completed, the generated first CTS cipher block CTS-C-BLK_1 is transmitted to the output register 310 of FIG. 3. The output register 310 adds the provided first cipher block C-BLK_1, the second cipher block C-BLK_2, and the third cipher block C-BLK_3, the fourth cipher block head C-BLK_4_h, and the first CTS cipher block CTS-C-BLK_1 to output the first cipher text C-TXT_1.

The operation of the encryption/decryption device 10 on the first plain text P-TXT_1 in the sections t1 to t2' may be similar to the operation of the encryption/decryption device 10 on the second plain text P-TXT_2 in the sections t2 to t3'. Similarly, the operation of the encryption/decryption device 10 on the third plain text P-TXT_3 in the sections t3 to t5 may be similar to the operation of the encryption/decryption device 10 on the first plain text P-TXT_1 in the sections t1 to t2'. That is, the time point at which the encryption of the first plain text P-TXT_1, the second plain text P-TXT_2, and the third plain text P-TXT_3 is finished is t5.

As described above, only one encryption/decryption core is required to encrypt the CTS plain block CTS-P-BLK subjected to the CTS calculation. Incidentally, since the encrypted cipher block is required to perform the CTS calculation, the CTS plain block CTS-P-BLK may not be encrypted at the same time as other plain blocks, and should be encrypted after the encryption of other plain blocks is finished. Also, while the CTS plain block CTS-P-BLK is encrypted in one encryption/decryption core, the other encryption/decryption cores except one core do not operate (sections t2 to t2' and sections t3 to t3'). However, since the encryption/decryption device 10 according to some embodiments of the present disclosure processes the CTS plain block CTS-P-BLK using the CTS core 430, it is possible to start encryption of other plain texts in other encryption/decryption cores (the first encryption/decryption core 230_1 and the second encryption/decryption core 230_2 in FIG. 13) while the CTS plain block CTS-P-BLK is being processed. Therefore, the pipe-line operation is possible.

Figure 14:
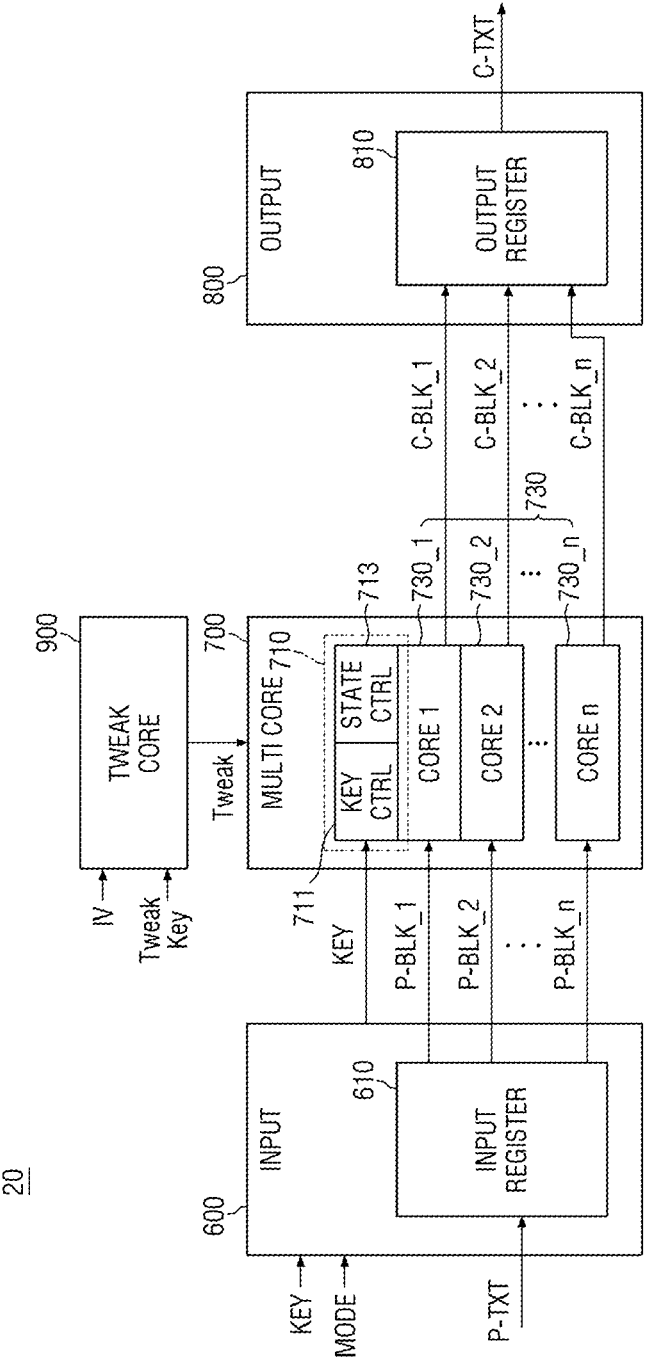
FIG. 14 is a block diagram showing an encryption/decryption device according to some other embodiments of the present disclosure.

FIG. 14 is a block diagram showing an encryption/decryption device according to some other embodiments of the present disclosure. Hereinafter, differences from the encryption/decryption device 10 shown in FIG. 3 will be mainly described.

Referring to FIG. 14, an encryption/decryption device 20 may include an input unit 600, a multi-core unit 700, an output unit 800, and a tweak core unit 900. The output unit 800 and the tweak core unit 900 may be the same as or similar to each of the output unit 300 and the tweak core unit 500 of FIG. 3.

The input unit 600 may include an input register 610. The operation of the input register 610 will be described later.

The multi-core unit 700 may include an encryption/decryption core control unit 710 and a plurality of encryption/decryption cores 730.

The encryption/decryption core control unit 710 may include a key control unit 711 and a state control unit 713. The key control unit 711 is provided with a key KEY from the input unit 600, and may generate a round key based on the key KEY. The round key generation process of the key control unit 711 may be the same as or similar to that of the key control unit 211 of FIG. 3.

Each of the plurality of encryption/decryption cores 730 may encrypt the plain blocks P-BLK under the control of the state control unit 713. Each encryption/decryption core 730 may start encryption at the same time in synchronization with each other under the control of the state control unit 713. Further, any one of the plurality of encryption/decryption cores 730 may encrypt the CTS plain block CTS-P-BLK. The encryption/decryption cores 730 may be the same as similar to each of the encryption/decryption cores 230 of FIG. 3, except that one of the plurality of encryption/decryption cores 730 encrypts the CTS plain block CTS-P-BLK.

Figure 15:
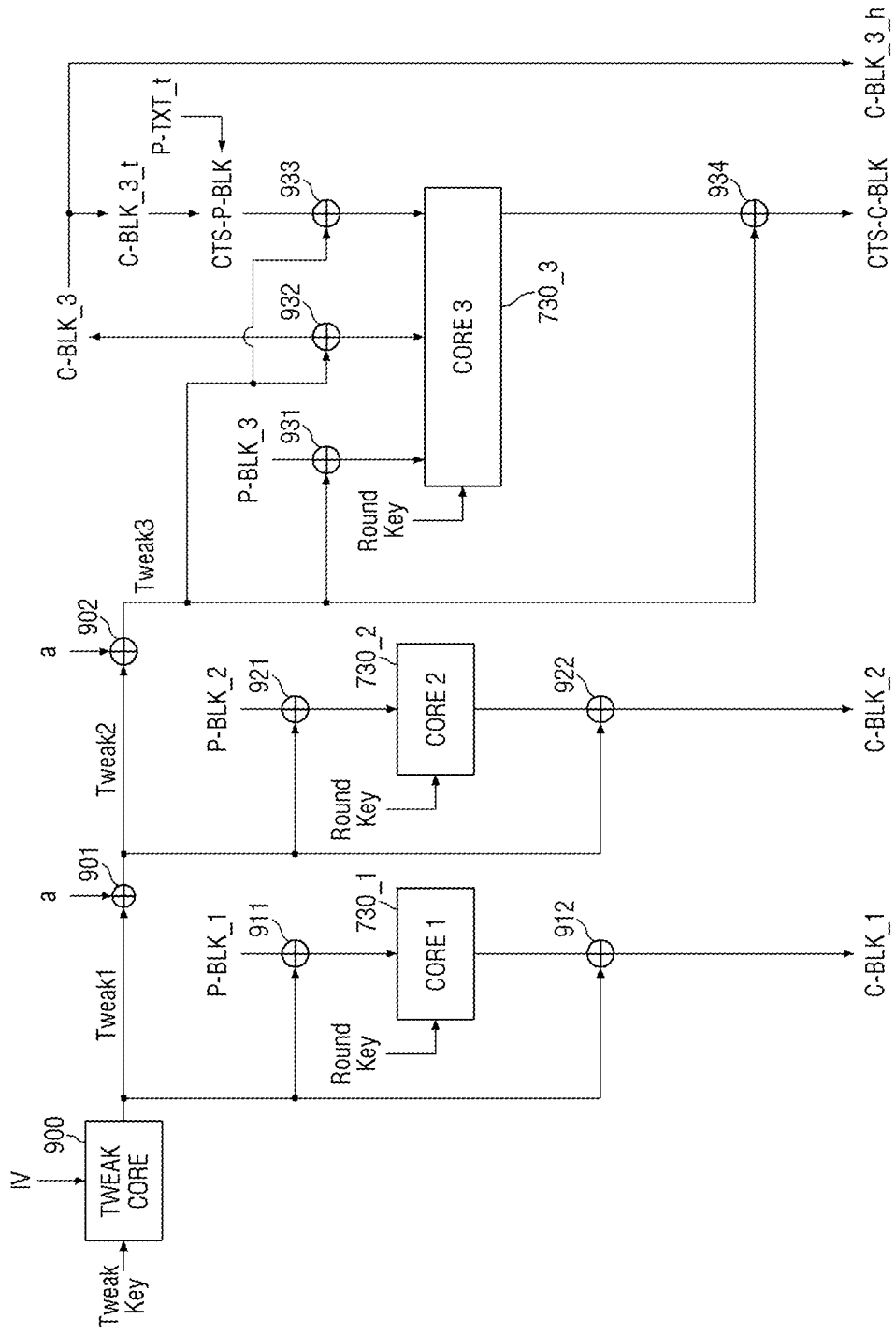
FIG. 15 and FIG. 16 are diagrams for explaining the encryption process according to some other embodiments of the present disclosure.
Figure 16:
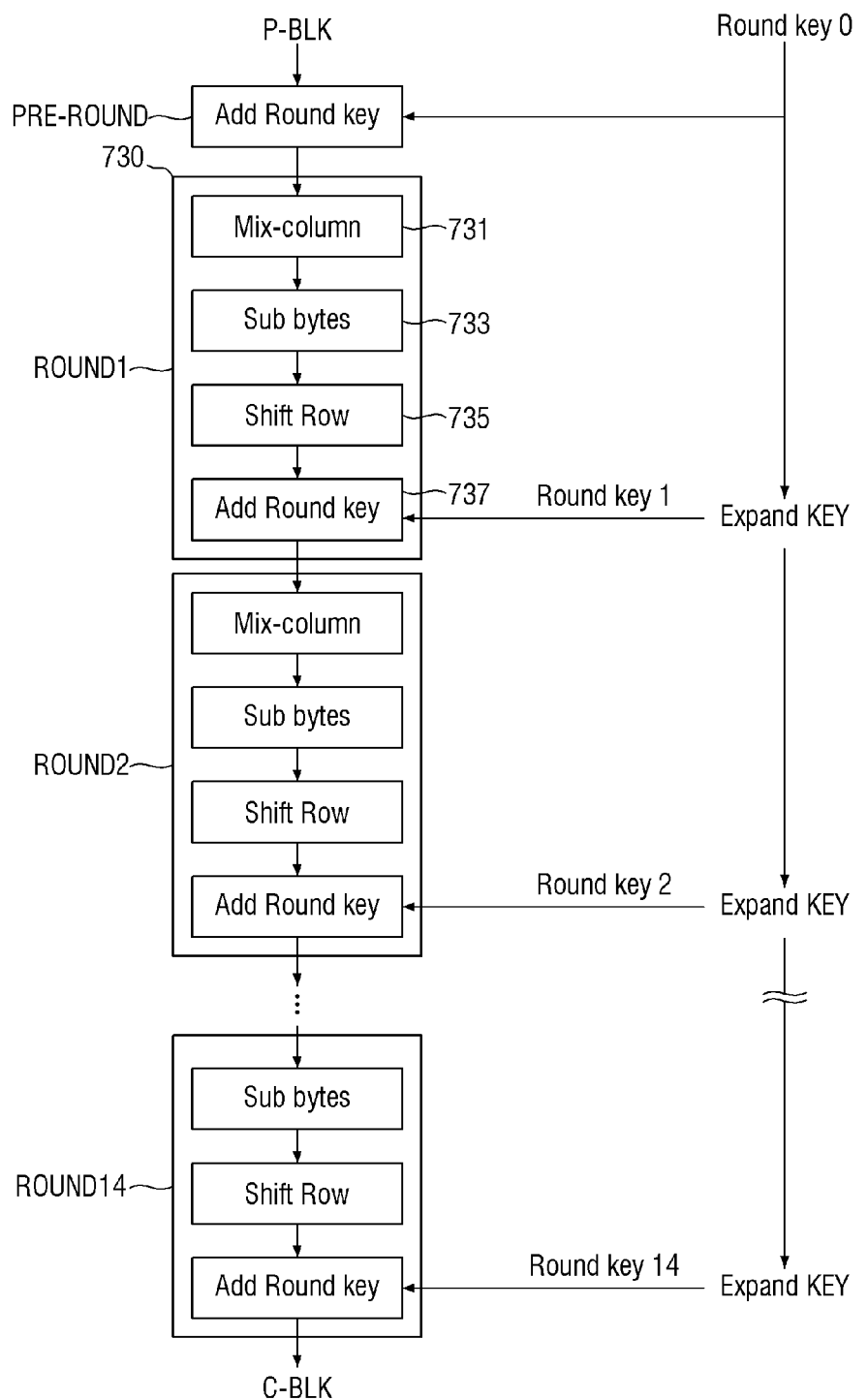

FIG. 15 and FIG. 16 are diagrams for explaining the encryption process according to some other embodiments of the present disclosure. Hereinafter, differences from FIG. 4 and FIG. 5a will be mainly described.

Referring to FIG. 14 and FIG. 15, the first plain block P-BLK_1 and the second plain block P-BLK_2 are encrypted in each of the first encryption/decryption core 730_1 and the second encryption/decryption core 730_2, and output to the first cipher block C-BLK_1 and the second cipher block C-BLK_2. The first cipher block C-BLK_1 and the second cipher block C-BLK_2 are stored in the output register 810 of FIG. 14.

Referring to FIG. 16, the process for encrypting the first plain block P-BLK_1 and the second plain block P-BLK_2 in the first encryption/decryption core 730_1 and the second encryption/decryption core 730_2 may be performed via multiple rounds. Each round of FIG. 16 may be the same as or similar to each round of FIG. 5a. That is, the four calculations of Mix-column, Sub Bytes, Shift Row, and Add Round key may be performed by circuitry such as each of a Mix-column module 731, a Sub Bytes module 733, a Shift Row module 735, and an Add Round key module 737. Alternatively, the four calculations of Mix-column, Sub Bytes, Shift Row, and Add Round key may be implemented as software, respectively.

Subsequently, referring to FIG. 14 and FIG. 15, the third plain block P-BLK_3 is encrypted in a third encryption/decryption core 730_3 and output to the third cipher block C-BLK_3. The third cipher block C-BLK_3 is divided into a third cipher block head C-BLK_3_h and a third cipher block tail C-BLK_3_t. The third cipher block head C-BLK_3_h is stored in the output register 810 of FIG. 14. The third cipher block tail C-BLK_3_t is added to the plain text tail P-TXT_t (that is, CTS calculation) and output to the CTS plain block CTS-P-BLK. The CTS plain block CTS-P-BLK is encrypted again in the third encryption/decryption core 730_3 and output to the CTS cipher block CTS-C-BLK. The CTS cipher block CTS-C-BLK is stored in the output register 810 of FIG. 14. The output register 810 is provided with the first cipher block C-BLK_1, the second cipher block C-BLK_2, the CTS cipher block CTS-C-BLK, and the third cipher block head C-BLK_3_h, sequentially adds them, and output them to the cipher text C-TXT. The CTS calculation described above may be performed by the multi-core unit 700 of FIG. 14, unlike the encryption/decryption device 10 of FIG. 3.

Figure 17:
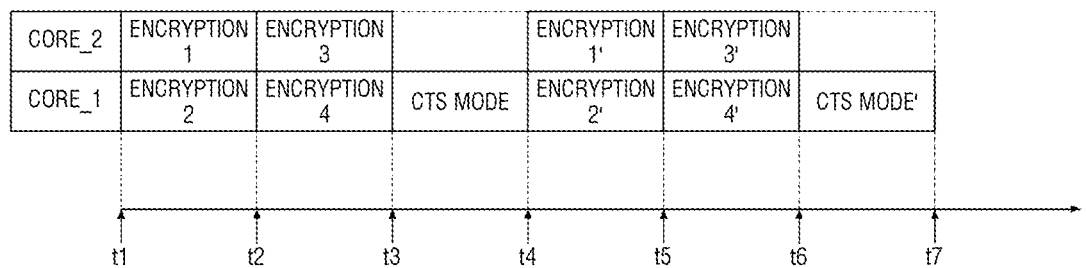
FIG. 17 is a diagram for explaining the operation of the encryption/decryption device of FIG. 14.

FIG. 17 is a diagram for explaining an operation of encrypting the first and second plain texts P-TXT_1 and P-TXT_2 in the encryption/decryption device of FIG. 14. FIG. 17 shows an example in which the multi-core unit 700 of FIG. 14 includes only two encryption/decryption cores, that is, the first encryption/decryption core 730_1 and the second encryption/decryption core 730_2. However, this is exemplary and the disclosure is not limited thereto.

Referring to FIG. 14 and FIG. 17, prior to the time point t1, the first plain text P-TXT_1 is divided into the first plain block P-BLK1, the second plain block P-BLK2, the third plain block P-BLK3 and the fourth plain block P-BLK4 and the first plane text tail P-TXT_1_t, and stored in the input register 610 of FIG. 14. At the time point t1, the first encryption/decryption core 730_1 starts encryption of the first plain block P-BLK_1 (ENCRYPTION 1), and the second encryption/decryption core 730_2 starts encryption of the second plain block P-BLK_2 in synchronization with the first encryption/decryption core 730_1 (ENCRYPTION 2). In the sections t1 to t2, that is, while the first plain block P-BLK_1 and the second plain block P-BLK_2 are encrypted, the third plain block P-BLK_3 and the fourth plain block P-BLK_4 are stored in the input register 610 of FIG. 14. Therefore, the input register 610 is configured to store remaining plain blocks while the plain blocks provided to the encryption/decryption core among the plain blocks are encrypted.

At the time point t2, when the encryption of the first plain block P-BLK_1 and the second plain block P-BLK_2 is completed, the generated first cipher block C-BLK_1 and second cipher block C-BLK_2 are transmitted to the output register 810 of FIG. 14, and the output register 810 stores the first cipher block C-BLK_1 and the second cipher block C-BLK_2. The first encryption/decryption core 730_1 starts encryption of the third plain block P-BLK_3 (ENGRYPTION 3), and the second encryption/decryption core 730_2 starts encryption of the fourth plain block P-BLK_4 (ENCRYPTION 4). That is, the input register 610 provides the first encryption/decryption core 730_1 and the second encryption/decryption core 730_2 with each of the third plain block P-BLK_3 and the fourth plain block P-BLK_4 at the time point t2. Therefore, the output register 810 is configured to store the cipher blocks, while the remaining plain blocks are encrypted before cipher blocks obtained by encrypting the plain blocks are output to the cipher text.

When the encryption of the third plain block P-BLK_3 and the fourth plain block P-BLK_4 is completed at the time point t3, the generated third cipher block C-BLK_3 is transmitted to the output register 310 of FIG. 3, and the output register 810 stores the third cipher block C-BLK_3. The fourth cipher block C-BLK_4 is divided into a fourth cipher block head C-BLK_4_h and a fourth cipher block tail C-BLK_4_t. The first plain text tail P-TXT_1_t and the fourth cipher block tail C-BLK_4_t are added and generated as the first CTS plain block CTS-P-BLK_1. The second encryption/decryption core 730_2 is provided with the first CTS plain block CTS-P-BLK_1 and starts encryption of the first CTS plain block CTS-P-BLK_1 at the time point t3 (CTS MODE).

At the time point t4, when the encryption of the first CTS plain block CTS-P-BLK_1 is completed, that is, when the CTS MODE is finished, the generated first CTS cipher block CTS-C-BLK_1 is transmitted to the output register 810 of FIG. 14.

The output register 310 adds the provided first cipher block C-BLK_1, the second cipher block C-BLK_2, and the third cipher block C-BLK_3, the fourth cipher block head C-BLK_4_h, and the first CTS cipher block CTS-C-BLK_1 to output the first cipher text C-TXT_1.

The operation of the encryption/decryption device 20 on the first plain text P-TXT_1 in the sections t1 to t4 may be the same as or similar to the operation of the encryption/decryption device 20 on the second plain text P-TXT_2 in the sections t4 to t7. That is, the encryption/decryption device 20 may encrypt the second plain text P-TXT_2 in the same manner as the encryption of the first plain text P-TXT_1.

As described above, the first and second encryption/decryption cores 730_1 and 730_2 may simultaneously encrypt the first and second plain blocks P-BLK_1 and P-BLK_2 having a 16-byte size. Even if the plain text P-TXT larger than 32 bytes is input, after dividing the plain text P-TXT in block units, the plain text P-TXT may be temporarily stored in the input register 610 of FIG. 14 before being provided to each of the encryption/decryption cores 730_1 and 730_2. Therefore, efficient data encryption is possible.

The input register 610 of FIG. 14 may be the same as or similar to the input register 111 of FIG. 3. Therefore, the division and temporary storage of the plain text P-TXT may be applied to both the encryption/decryption device 10 of FIG. 3 and the encryption/decryption device 20 of FIG. 14.

Although the present specification has described only the process of encrypting plain text P-TXT into the cipher text C-TXT, the technical idea of the present disclosure may be similarly applied to not only the encryption process but also the process of decrypting the encrypted data. That is, the present disclosure may also be applied to the process of decoding the cipher text C-TXT into the plain text P-TXT.

As set forth above, embodiments of the present disclosure provide encryption/decryption devices capable of encrypting data at high speed. Embodiments of the present disclosure also provide encryption/decryption devices capable of encrypting data at high speed. Embodiments of the present disclosure also provide encryption/decryption devices with increased degrees of integration.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A memory device, comprising:
   an input electrical circuit configured to receive a plain text and output a plurality of plain blocks and a CTS (Cipher Text Stealing) plain block;
   a multi-core electrical circuit including a plurality of encryption or decryption cores, wherein the multi-core electrical circuit is configured to
      encrypt each of the plurality of plain blocks provided from the input electrical circuit and
      output a cipher block in accordance with control of an encryption or decryption core control electrical circuit;
   a CTS core electrical circuit including a CTS core configured to encrypt the CTS plain block provided from the input electrical circuit into a CTS cipher block; and
   an output electrical circuit configured to receive the cipher block and the CTS cipher block and output a cipher text,
   wherein the input electrical circuit is configured to receive a mode signal, and the mode signal is configured to control the input electrical circuit to generate the CTS plain block through a CTS calculation, when the plain text is not a multiple of block units, and
   wherein the CTS plain block is generated by adding a part of the cipher block and a plain text tail corresponding to a part of the plain text other than a plain text body when the plain text is divided by the block units.

2. The memory device of claim 1, wherein
   the input electrical circuit includes a distributor, the distributor is configured to divide the plain text into the plain text body and the plain text tail.

3. The memory device of claim 2,
   wherein the input electrical circuit further comprises a multi-core control electrical circuit,
   the multi-core control electrical circuit is configured to receive the plain text body, and provide the plain text body to each of the plurality of encryption or decryption cores by dividing the plain text body into the block units.

4. The memory device of claim 2, wherein the input electrical circuit further comprises a CTS control electrical circuit, and
the CTS control electrical circuit is configured to receive any one of one or more cipher blocks from the multi-core electrical circuit and generate the CTS plain block of the one or more block units according to the mode signal.

5. The memory device of claim 2, wherein the input electrical circuit includes an input register, and
the input register is configured to store remaining one or more plain blocks, while the plain block provided to the encryption or decryption core is encrypted.

6. The memory device of claim 2, wherein the output electrical circuit includes an output register, and the output register is configured to store the cipher block, while one or more remaining plain blocks are encrypted before the cipher block obtained by encrypting the plain block is output to the cipher text.

7. The memory device of claim 1, further comprising:
a tweak core electrical circuit,
wherein the tweak core electrical circuit is provided with a tweak key and an initial vector to generate a tweak corresponding to the plain block.

8. The memory device of claim 1, wherein the CTS core electrical circuit further comprises a CTS core control electrical circuit which is configured separately from the encryption or decryption core control electrical circuit and is configured to control the CTS core.

* * * * *